United States Patent [19]

Gellert

[11] Patent Number: 4,771,164
[45] Date of Patent: Sep. 13, 1988

[54] INJECTION MOLDING NOZZLE AND METHOD

[76] Inventor: Jobst U. Gellert, 7A Prince Street, Georgetown, Ontario, Canada, L7G 2X1

[21] Appl. No.: 32,591

[22] Filed: Apr. 1, 1987

[51] Int. Cl.⁴ .............................................. F27B 14/00
[52] U.S. Cl. .................................... 219/421; 219/424
[58] Field of Search ............... 219/421, 424, 530, 544; 222/146 HE; 425/144; 29/611; 228/176

[56] References Cited

U.S. PATENT DOCUMENTS

| | | | |
|---|---|---|---|
| 4,238,671 | 12/1980 | Gellert | 219/421 |
| 4,355,460 | 10/1982 | Gellert | 29/611 |
| 4,386,262 | 5/1983 | Gellert | 219/424 |
| 4,403,405 | 9/1983 | Gellert | 29/611 |
| 4,446,360 | 5/1984 | Gellert | 219/421 |
| 4,450,999 | 5/1984 | Gellert | 228/176 |
| 4,557,685 | 12/1985 | Gellert | 425/549 |
| 4,583,284 | 4/1986 | Gellert | 29/611 |

FOREIGN PATENT DOCUMENTS 1174020 9/1984 Canada .

Primary Examiner—E. A. Goldberg
Assistant Examiner—M. M. Lateef
Attorney, Agent, or Firm—Riches, McKenzie & Herbert

[57] ABSTRACT

This invention relates to an improved injection molding nozzle and a method of making it. The nozzle has an electric heating element integrally vacuum cast in copper in spiral channels set in the outer surface of the tool steel nozzle body. The heating element has a cold terminal at one end which projects out through a hole in a head plate which is rotatable prior to casting to ensure the nozzle has a consistent length of heating element cast in. A sleeve is located over the spiral channel prior to casting to ensure the heating element in the channel is covered with a minimum depth of copper to dissipate the heat from the heating element. The spiral channel can be cut with a varying pitch according to a predetermined profile to provide more heat where there is more heat loss.

14 Claims, 5 Drawing Sheets

INJECTION MOLDING NOZZLE AND METHOD

BACKGROUND OF THE INVENTION

This invention relates to an improved integral injection molding nozzle and a method of making it in which an electrical heating element is vacuum cast in copper in a spiral channel around the outer surface with the copper completely covering the heating element.

Casting helical heating elements in copper in an injection molding nozzle is well known in the art. For instance, the applicant's U.S. Pat. No. 4,238,671 entitled "Sprue Bushing with Cast in Heater Element" which issued Dec. 9, 1980 shows a helical heating element cast around a high strength corrosion resistant inner core portion through which the melt passage extends. An improvement in this early method is shown in the applicant's U.S. Pat. Nos. 4,355,460 entitled "Sprue Bushing and Method of Manufacture" which issued Oct. 26, 1982 and 4,386,262 (divisional) entitled "Sprue Bushing with Cast in Electrical Heating Element" which issued May 31, 1983. In these patents, the helical heating element is cast in a copper portion between the inner core portion and an outer sleeve. Further improvements are shown in the applicant's U.S. Pat. Nos. 4,403,405 entitled "Sprue Bushing Connector Assembly Method" which issued Sept. 13, 1983 and 4,446,360 (divisional) entitled "Sprue Bushing Connector Assembly" which issued May 1, 1984 which specifically relate to sealing around the heating element cold terminal using a split washer arrangement. While the nozzles disclosed in all of the above patents have the advantage that the heating element is cast in copper which rapidly disperses the heat, they have been found to have several disadvantages for certain applications. Firstly, with the increasing demand for high temperature and high pressure applications, it is not possible to provide the required bursting strength without increasing the outside diameter of the nozzles, which is not acceptable for some cavity configurations. Bursting strength minimum requirements of 50,000 psi. are now quite common and this is dificult because the copper portion around the heating element is relatively weak and does not add much strength. Secondly, it is desirable that the coils of the heating element be accurately located in the nozzle. Furthermore, because there is usually more heat loss at the ends of the nozzle than in the middle, it is desirable that the pitch of the heating element vary along the length of the nozzle according to a predetermined pattern, depending upon the application. This has not been found to be possible with these previous nozzles where the central core is inserted into the helical heating element which is then cast in copper.

More recently, in order to overcome some of these and other problems, the applicant has provided a nozzle with a heating element brazed in a spiral channel in the outer surface of the nozzle body. This is shown in the applicant's U.S. Pat. Nos. 4,557,685 entitled "Heated Nozzle for Injection Molding Apparatus" which issued Dec. 10, 1985 and 4,583,284 (divisional) entitled "Method of Manufacture of Injection Molding Heated Nozzle with Brazed in Heating Element" which issued Apr. 22, 1986. However, unfortunately this has been found not to be entirely satisfactory because the nickel brazing compound does not flow, evenly throughout the spiral channel and thus the contact between the heating element and the body is not uniform throughout its length.

SUMMARY OF THE INVENTION

Accordingly, it is an object of the present invention to at least partially overcome the disadvantages of the prior art by providing an improved injection molding nozzle and method wherein an electrical heating element is vacuum cast in a spiral groove with a predetermined profile to completely cover the heating element with a minimum depth of copper.

To this end, in one of its aspects, the invention provides a method of making an integral injection molding heated nozzle comprising the steps of forming an elongated steel body having a forward end and a rear end with a central bore extending therebetween, the body having a generally cylindrically outer surface with a head adjacent the rear end and a spiral channel extending therearound from adjacent the forward end to adjacent the rear end, winding an electrically insulated heating element in the channel with one end fixed in the channel adjacent the forward end of the body and a cold terminal at the opposite end extending from the channel adjacent the rear end of the body, locating a steel head plate on the head of the body, the head plate having a central opening therethrough which receives the head of the body in a position to cover the portion of the channel extending around the head, the head plate having a hole extending radially therethrough from the central opening to receive the end of the heating element having the cold terminal, whereby the head plate can be slightly rotated on the head of the body to provide a predetermined length of the heating element projecting therefrom to compensate for slight variations in winding the heating element in the spiral channel, inserting the forward end of the body into a steel sleeve to a position wherein the sleeve covers the spiral channel between the head and the forward end of the body, the sleeve having an inner diameter slightly larger than the outer diameter of the outer surface of the body, sealing the joints around the sleeve and the head plate and sealing around the cold terminal to prevent substantial leakage securing a filler reservoir in communication with the spiral channel and inserting a predetermined quantity of copper in the filler tube; casting the assembly in a vacuum furnace to melt the copper which flows along the heating element to fill the spiral channel beneath the sleeve and the head plate to completely cover the heating element in the channel to a minimum depth and form an integral bond between the heating element and the surrounding steel body, and machining the integral nozzle to remove the filler reservoir and to provide the desired shape and finish.

In another of its aspects, the invention provides an integral injection molding heated nozzle comprising an elongated steel body having a forward end and a rear end with a central bore extending therebetween, the body having a generally cylindrical outer surface with an enlarged head adjacent the rear end and a spiral channel extendng therearound from adjacent the forward end to adjacent the rear end, the head having a tapered outer surface, a steel head plate having a central opening therethrough with a tapered inner surface which matches the tapered outer surface of the head of the body, the head plate being seated on the head of the body with the tapered inner surface abutting on the tapered outer surface of the head to cover the portion of the spiral channel extending around the head, the head plate having a hole extending radially outward therethrough from the central opening and transverse bolt holes to mount the nozzle in position in an injection molding system, a steel sleeve extending around the body from adjacent the forward end, the sleeve having a steel collar fixed to one end which abuts against the head, the sleeve having an inner diameter slightly larger than the outer diameter of the outer surface whereby the sleeve and collar cover the spiral channel between the head and the forward end of the body, and an electrically insulated heating element wound in the spiral channel to extend from one end adjacent the forward end of the body to an opposite end having a cold terminal connected thereto extending out through the radially extending hole through the head plate, the heating element being vacuum cast in copper which completely fills the spiral channel and forms an integral bond between the heating element and the surrounding steel body and integrally bonds the sleeve to the outer surface of the body.

Further objects and advantages of the invention will appear from the following description, taken together with the accompanying drawings.

DETAILED DESCRIPTION OF THE DRAWINGS

Figure 1:
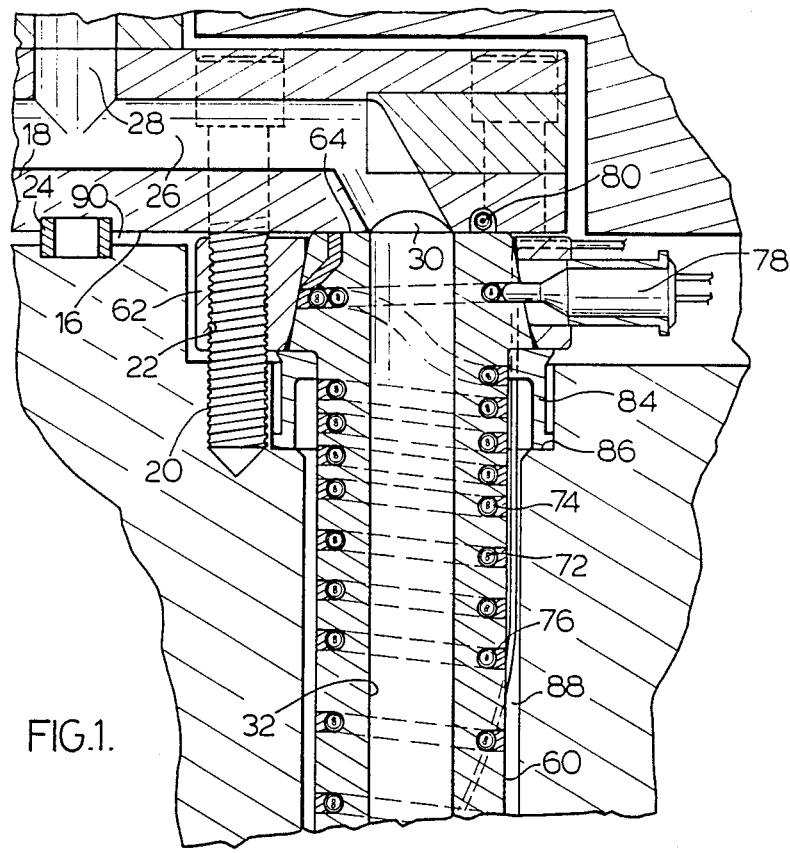
FIG. 1 is a sectional view showing a portion of a multi-gate injection molding system with nozzles made according to a first embodiment of the invention.
Figure 1:
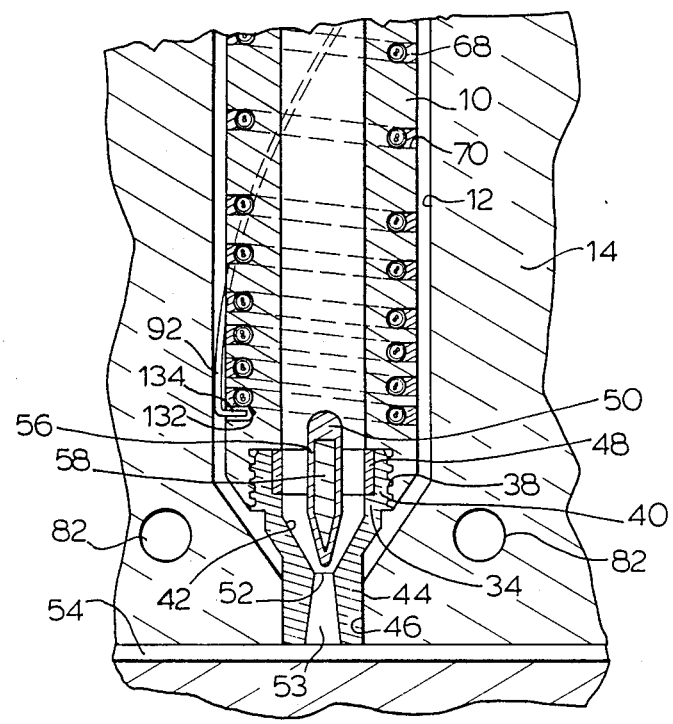

Reference is first made to FIG. 1 which shows a portion of a multi-gate hot tip gated injection molding system having a number of nozzles 10, each of which are seated in a well 12 in a cavity plate 14. Each nozzle 10 is held tightly against the underside 16 of an elongated manifold 18 by bolts 20 which extend through holes 22 in the nozzle 10 into the cavity plate 14. The manifold 18 is located relative to the cavity plate 14 by a locating ring 24 seated centrally between them, and has a melt bore 26 which branches longitudinally from a central inlet 28. The melt bore 26 in the manifold 18 leads to an outlet 30 on the underside 16 which is in alignment with a central bore 32 through the nozzle 10. In this embodiment, the central bore 32 has an enlarged mouth 34 at its forward end 36 with threads 38 to removably receive tip insert 40. The tip insert 40 has a tapered central bore 42 in alignment with the central bore 32 and a cylindrical nose portion 44 which is received in an opening 46 through the core 14 and locates the forward end 36 of the nozzle. As can be seen, the tip insert 40 holds a torpedo assembly 48 firmly in place with an elongated torpedo 50 extending in the bore 42 which forms a gate 52 on a sprue 53 leading to the cavity 54. As described in the applicant's U.S. Pat. No. 4,450,990 entitled "Improved Injection Molding Hot Tip Seal" which issued May 29, 1984, the torpedo has an outer portion 56 made of high speed steel to be abrasion and corrosion resistant and an inner portion 58 made of copper which is highly conductive to improve the flow of heat to the area of the gate 52.

The nozzle has a generally cylindrical outer surface 60 and an enlarged head plate 62 at the rear end 64 through which the bolt holes 22 extend. The nozzle is heated by an elecrical heating element 66 which is cast in copper 68 in a spiral channel 70 in the outer surface 60. As described in the applicant's U.S. Pat. No. 4,557,685 referred to above, in this embodiment, the heating element 66 is double wire with a chromalloy resistance wire 72 extending through a refractory powder electrical insulating material 74 such as compacted magnesium oxide powder inside a steel casing 76. The heating element 66 has an enlarged cold terminal 78 which projects outwardly from the head plate 62 for connection to a suitable controlled power source. The manifold 18 is heated by an electrical heating element 80 which is cast into it as described in the applicant's Canadian patent No. 1,174,020 entitled "Injection Molding Manifold Member and Method of Manufacture" which issued Sept. 11, 1984. The mold cavity plate 14 is cooled by cooling water pumped through cooling conduits 82 in a conventional manner. As is well known, in order to reduce heat loss to the cooled cavity plate 14, the nozzle 10 is located by an insulation bushing 84 seated on a shoulder 86 to provide an insulative air space 88 between them. Similarly, the locating ring 24 provides an insulative air space 90 between the hot manifold 18 and the cooled cavity plate 14. As described in more detail below, a thermocouple 92 is mounted to extend through the air space 88 to measure the temperature adjacent the heating element 66.

Figure 2:
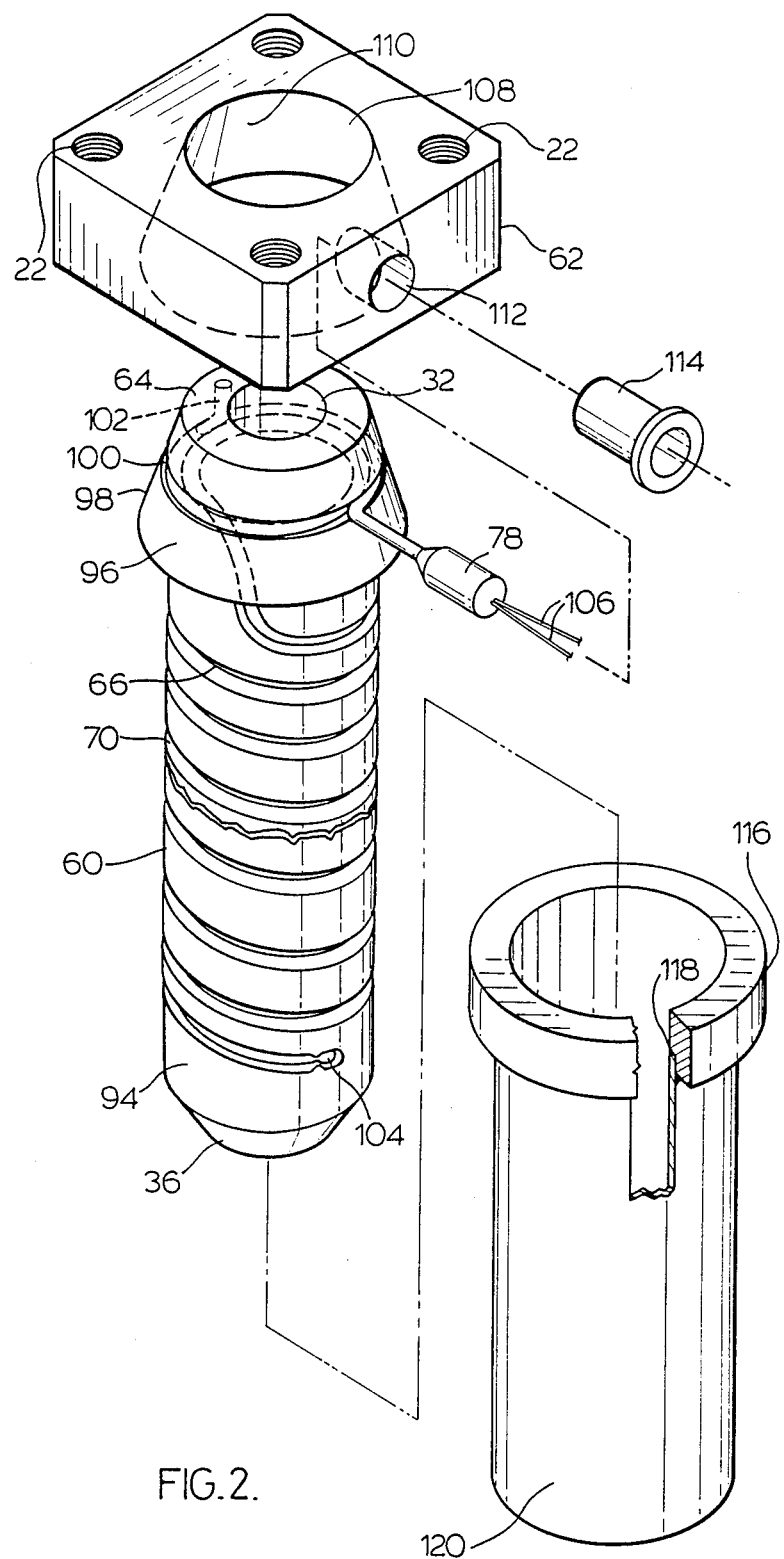
FIG. 2 is an exploded isometric view showing some of the steps in making the nozzle seen in FIG. 1.

The steps involved in making the nozzles according to the first embodiment of the invention will now be described with particular reference to FIGS. 2, 3 and 4. An elongated body 94 is machined of a tool steel such as H13 to have a generally cylindrical outer surface 60 with an enlarged head 96 adjacent the rear end 64. The head 62 has a tapered outer surface 98 and a spiral channel 70 is machined in the outer surface 60. As can be seen, this channel 70 extends to the head 96 where it is cut deeper to have a uniform inner diameter throughout, and the upper groove 100 adjacent the rear end 64 extends circularly rather than diagonally around the head 96. A central bore 32 is drilled through the body 94 to provide the melt passage, and it will be appreciated that for large volume applications it is desirable that the diameter of the central bore 32 be as large as possible relative to the outer diameter of the nozzle. A small filler duct 102 is drilled to extend between the rear end 64 and the upper groove 100 of the spiral channel 70. As described above, the central bore 32 is enlarged adjacent the forward end 36 to form a mouth 34 which is threaded to receive the tip insert 40 with the torpedo assembly 48.

The electrical heating element 66 is wound in the spiral channel 70 beginning with one end 104 which is fixed in the channel 68 adjacent the forward end 36 of the body 94. While the end 104 can be fixed in place by spot welding, it is more conveniently done by burring the edges of the channel using a special punch. The other end of the heating element 66 projects from the channel 68 adjacent the rear end 64 with an enlarged cold terminal 78 from which terminal wires 106 extend. In this embodiment, two windings of the heating element 66 are wound in the last groove 100 to provide additional heating to the enlarged head 96.

A head plate 62 is machined of a tool steel such as H13 with a central opening 108 with a tapered inner surface 110 which matches the tapered outer surface 98 of the head 96. A hole 112 is drilled radially outward from the central opening 108 which is large enough to receive the cold terminal 78 of the heating element 66. Bolt holes 22 are also drilled in the head plate 62 to receive the bolts 20 to attach the nozzle 10 to the manifold 18, as described above. The cold terminal 78 is inserted through the radial hole 112 from the inside as the head plate 62 is placed on the head 96 of the body 94. The tapered inner surface 110 of the central opening 108 abuts against the matching tapered outer surface 98 of the head 96 to accurately locate the head plate 62 in this position where it covers the portion of the heating element 66 in the upper groove 100. When the heating element 66 is wound in the spiral channel 70, it is done carefully to ensure the element is completely within the channel throughout its length. However, no matter how carefully this is done, it is not possible to wind exactly the same length of heating element in the channel repeatedly. For any particular sized nozzle, the heating elements are made the same length and it will be appreciated that it is important that an equal length of the heating element be wound in the channel for each nozzle to provide consistent heating characteristics. This is achieved with the present method by tightening the heating element 66 in the spiral channel 70 and rotating the head plate 62 clockwise on the head 96 of the body 94 until a predetermined length of the heating element with the cold terminal 78 extends from the hole 112. A cold terminal sleeve 114 is then inserted over the projecting cold terminal 74 with one end seated around the hole 112 in the head plate 62.

A stainless steel collar 116 is lasar welded to one end 118 of a cylindrical stainless steel sleeve 120. The forward end 36 of the body 94 is then inserted into them until the collar abuts against the underside 122 of the head 96 and head plate 62 in a position where it covers the joint 122 between the tapered surfaces 98 and 110. The sleeve 120 has an inside diameter which is only slightly larger than the outside diameter of the cylindrical outer surface 60 of the body 94. Thus, the sleeve 120 covers the spiral channel 70 between the heat 96 and the forard end 36. As can be seen in FIG. 3, the head plate 62, cold terminial sleeve 114, collar 116 and sleeve 120 are all lasar welded where indicated by reference numeral 124 to hold them in place and to seal the joints between them and the body 94 to prevent leakage of copper.

An open ended filler reservoir 126 is welded on the rear end 64 of the body 94 to seal against leakage from an outlet leading to the filler duct 102. A slug 128 of a predetermined quantity of copper is inserted into the filler reservoir 126 and the assembly is inserted in this upright position into a vacuum furnace 130. In this embodiment, as the furnace is gradually heated to a temperature of approximately 2050° F., the furnace is evacuated to a relatively high vacuum to remove substantially all of the oxygen. However, before the melting temperature of copper is reached, the vacuum is reduced by partially backfilling with an inert gas such as argon or nitrogen to avoid vapourization of the copper. When the slug 128 of copper melts in the partial vacuum, it runs through the filler duct 102 to the spiral channel 70 and along the spiral channel to completely fill it with copper around the heating element. As will be appreciated, the channel 70 is filled with copper out to the surrounding sleeve 120 which provides a minimum depth of copper over the heating element 66 which is sufficient to uniformly dissipate heat from the heating element along its length. While providing a sufficient coverage of copper, this method also maximizes the thickness of steel of the body 94 left between the central bore 32 and the spiral channel to retain sufficient bursting strength. Thus, for any particular bursting strength requirement, the diameter of the central bore 32 can be quite large relative to the outside diameter of the nozzle. Casting the copper in a partial vacuum provides a metallurgical bonding of the copper to the casing 76 of the heating element 66 and to the body 94 of the nozzle. Thus an integral structure is provided which efficiently transfers heat from the heating element and distributes it more uniformly along the central bore 32. As can be seen, the pitch or profile of the heating element 66 varies along its length to provide more heat at the ends of the nozzle than in the middle where there is less heat loss. This profile is precisely controlled for any particular application by varying the pattern of the spiral channel 70 which is cut in the outer surface 60 of the body 94.

After the nozzles are cooled and removed from the vacuum furnace, the nozzles are machined to remove the filler tube 126 and to provide the desired shape and finish. In this embodiment, the sleeve 120 and part of the collar 116 are also machined of to reduce the outside diameter of the nozzle. If outside diameter is not a factor, then the sleeve 120 may not be removed. As described above, prior to use, a tip insert 40 is screwed into the mouth 34 to mount the torpedo assembly 48 in place.

Figure 3:
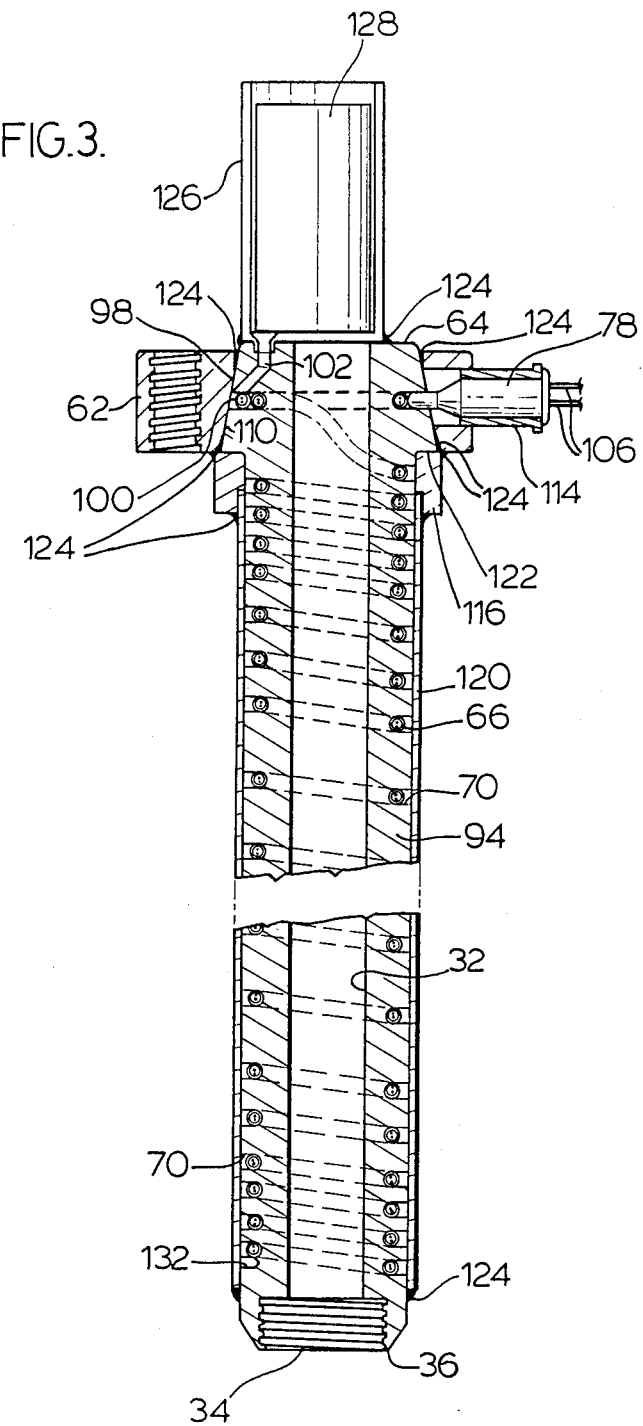
FIG. 3 is a sectional view showing the filler tube located on the body of the nozzle.
Figure 4:
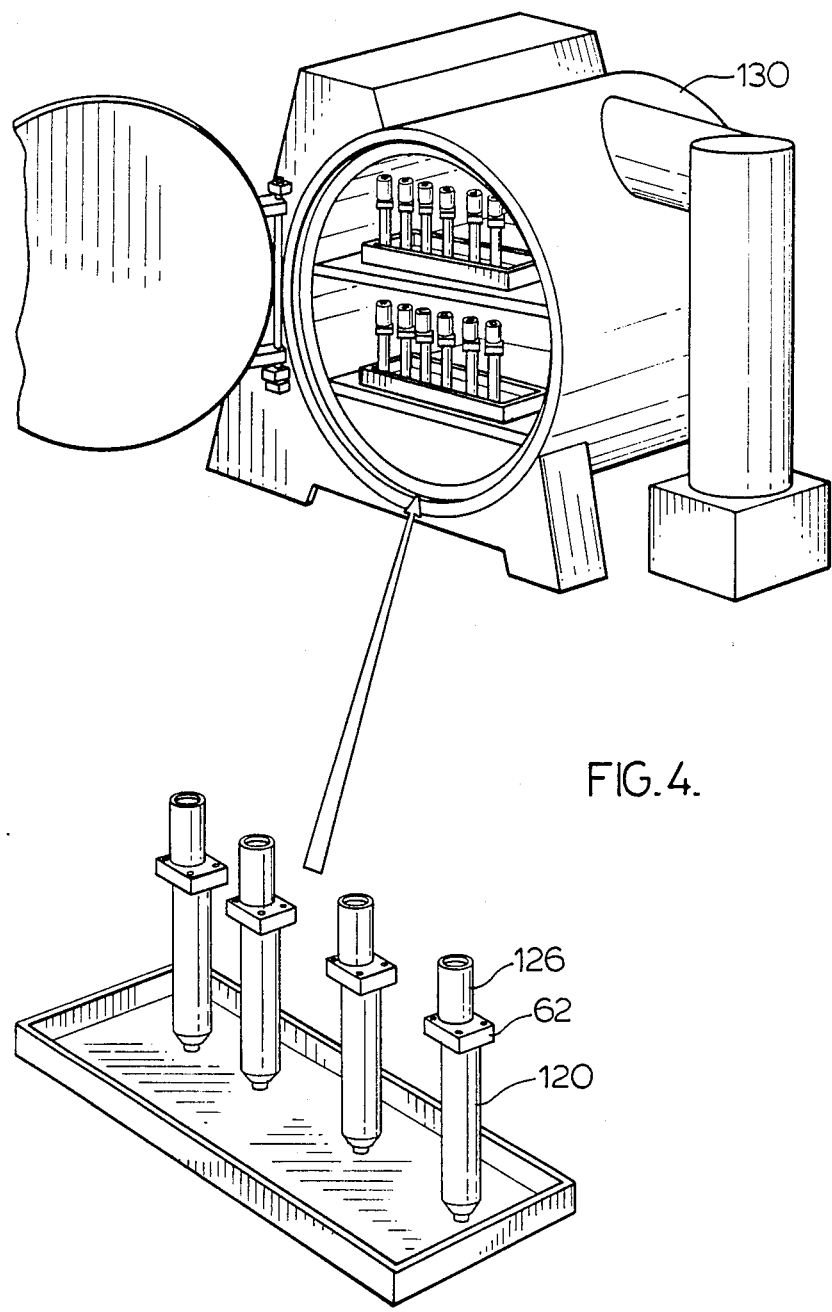
FIG. 4 shows a batch of assembled units ready to be inserted into a vacuum furnace.

As shown in FIGS. 1 and 3 when the body 94 is made, a well 132 is drilled in the outer surface 60 in communication with the spiral channel 70 adjacent the forward end 36. When the copper is cast in the vacuum furnace 130, it runs through the spiral channel 70 and also fills this well 132. After the sleeve 120 is machined off, a hole 134 is drilled in this copper to receive the thermocouple 92 to measure the temperature adjacent the heating element 66.

In use, after the system has been assembled as described above electrical power is applied to the heating elements 66 and 80 to heat the manifold 18 and the nozzles 10 to a predetermined operating temperature. Pressurized melt from a molding machine (not shown) is then introduced according to a predetermined cycle into the central inlet 28 of the melt bore 26 of the manifold 18, from where it flows through the melt bore 26 of each nozzle 10 to fill the cavities 54. After the cavities 54 are full, injection presure is held momentarily to pack and then released. After a short cooling period, the mold is opened to eject the product. After ejection, the mold is closed the injection pressure is reapplied to refill the cavity. This cycle is repeated in a continuous cycle with a frequency dependent on the size and shape of the cavity and the type of material being molded.

Figure 5:
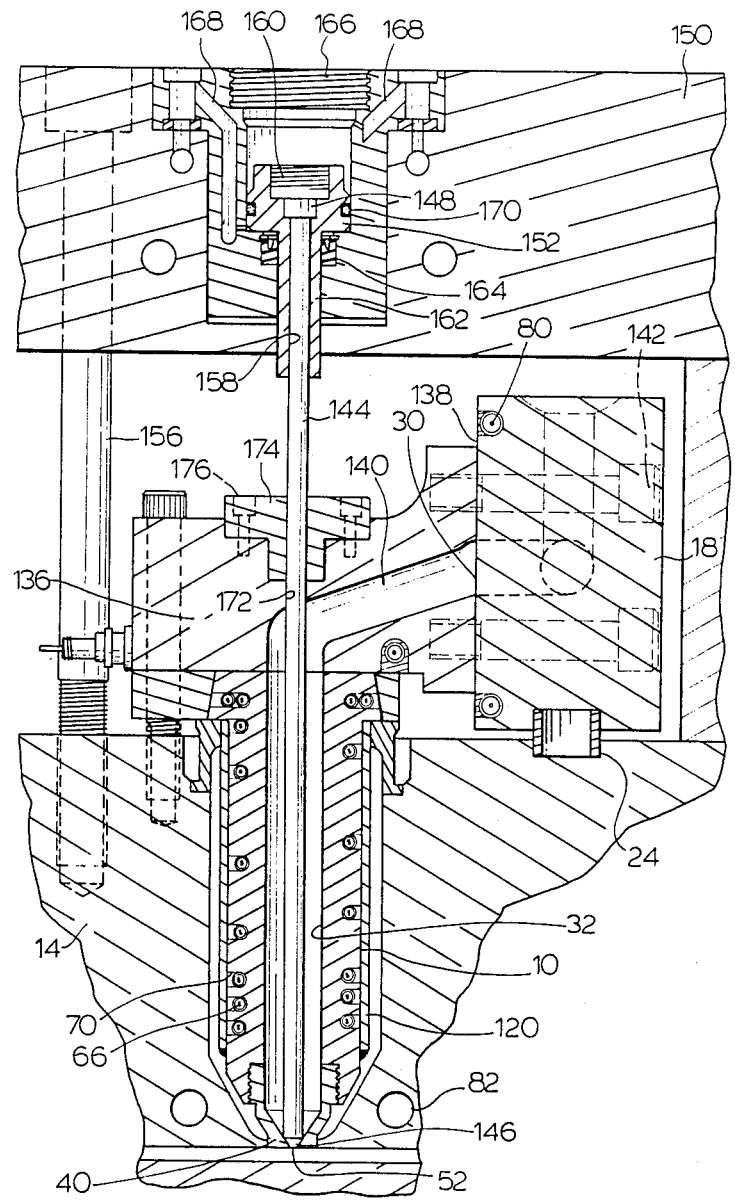
FIG. 5 is a sectional view similar to FIG. 1 showing a nozzle made according to another embodiment of the invention.

Reference is now made to FIG. 5 which shows a nozzle according to another embodiment of the invention in a valve-gated system. As many of the elements are identical to those of the first embodiment described above, elements common to both embodiments are described and illustrated using the same reference numerals. This type of injection molding system is similar to that described in the applicant's Canadian patent application Ser. No. 524,208 entitled "Side Mounted Manifold Block for Variable Orientation of Injection Molding Nozzle" filed Oct. 31, 1986 by Mold-Masters Limited. In this system, each nozzle 10 is mounted on a manifold offset block 136 which is bolted with a desired orientation to the side 138 of the manifold 18. Each offset block 136 has a melt duct 140 which connects the outlet 30 from the manifold to the central bore 32 of the nozzle 10. While bolts 142 hold the manifold block 136 tightly enough against the side 138 of the manifold to prevent leakage of the pressurized melt, they do allow slight lateral movement therebetween to accomodate thermal expansion and contraction of the manifold to avoid leakage due to misalignment of the nozzle.

Each nozzle 10 has an elongated valve pin 144 extending centrally through the central melt bore 26. The valve pin has a tapered tip end 146 and an enlarged driven end 148 which is engaged by hydraulic actuating mechanism seated in the mold back plate 150. As described in the applicant's U.S. Pat. No. 4,468,191 which issued Aug. 28, 1984, the actuating mechanism includes a piston 152 which reciprocates in a cylinder 154 seated in the mold back plate 150. The cylinder is fixed in the mold back plate 150 by bolts (not shown) and the mold back plate is held securely by bolts 156 which extend into the cavity plate 14. The valve pin 144 extends through a hole 158 in the piston 152 and is secured to it by a threaded plug 160 which screws into the piston 152 and also seals against leakage of the hydraulic fluid. The piston has an elongated neck portion 162 and a V-shaped high temperature seal 164 is seated in the cylinder 154 to prevent leakage of pressurized hydraulic fluid around it. The cylinder 154 has a threaded cap 166 which is larger in diameter than the piston 152 so that the piston 152 and valve pin 144 can be removed if necessary. Pressurized hydraulic fluid is supplied to the cylinder 154 on opposite sides of the piston 152 through ducts 168 from a controlled source (not shown) to reciprocate the piston according to a predetermined cycle. In the forward closed position the valve pin tip end 146 is sealed in the gate 52, while in the retracted open position the piston abuts against the cap 166. An O-ring 170 is also provided to prevent leakage of the pressurized hydraulic fluid around the piston. The valve pin 144 extends through a valve pin bore 172 in the offset block 136 and through a sealing bushing 174 which is secured to the offset block 136 by screws 176. The offset block 136 and the bushing 174 are also made of H13 steel and the bores through them are nitrited to reduce wear by the reciprocating valve pin 144.

The nozzle 10 is the same as that described above except that the sleeve 120 has not been machined off because reducing outside diameter is not necessary for this application. As may be seen, a portion of the collar 116 has been machined off to accommodate the insulation bushing 118. Also, the configuration of the tip insert 40 is different to provide the valve gate 52. Otherwise the structure and method of casting the heating element 66 in the spiral channel 70 is the same as that described above and need not be repeated. Each nozzle 10 is held tightly against the offset block 136 by the bolts 20 which extend through the holes 22 in the head plate 62 into the cavity plate 14.

While the description of the nozzle and method of making it have been given with respect to preferred embodiments, it is not to be construed in a limiting sense. Variations and modifications will occur to those skilled in the art. For example, it will be appreciated that nozzles according to the invention can be used with a variety of different systems. Thus tip inserts may be used having various configurations, or the forward end of the nozzles can be machined to provide other gate arrangements without using tip inserts. Other suitable methods of sealing such as nickel brazing and welding may be used rather than lasar welding. Reference is made to the appended claims for a definition of the invention.

What I claim is:

1. A method of making an integral injection molding heated nozzle comprising the steps of:
    (a) forming an elongated steel body having a forward end and a rear end with a central bore extending therebetween, the body having a generally cylindrically outer surface with a head adjacent the rear end and a spiral channel extending therearound from adjacent the forward end to adjacent the rear end,
    (b) winding an electrically insulated heating element in the channel with one end fixed in the channel adjacent the forward end of the body and a cold terminal at the opposite end extending from the channel adjacent the rear end of the body,
    (c) locating a steel head plate on the head of the body, the head plate having a central opening therethrough which receives the head of the body in a position to cover the portion of the channel extending around the head, the head plate having a hole extending radially therethrough from the central opening to receive the end of the heating element having the cold terminal, whereby the head plate can be slightly rotated on the head of the body to provide a predetermined length of the heating element projecting therefrom to compensate for slight variations in winding the heating element in the spiral channel,
    (d) inserting the forward end of the body into a steel sleeve to a position wherein the sleeve covers the spiral channel between the head and the forward end of the body, the sleeve having an inner diameter slightly larger than the outer diameter of the outer surface of the body,
    (e) sealing the joints around the sleeve and the head plate and sealing around the cold terminal to prevent substantial leakage,
    (f) securing a filler reservoir in communication with the spiral channel and inserting a predetermined quantity of copper in the filler tube,
    (g) casting the assembly in a vacuum furnace to melt the copper which flows along the heating element to fill the spiral channel beneath the sleeve and the head plate to completely cover the heating element in the channel to a minimum depth and form an integral bond between the heating element and the surrounding steel body, and
    (h) machining the integral nozzle to remove the filler reservoir and to provide the desired shape and finish.

2. A method as claimed in claim 1 wherein the head of the body is enlarged and has a tapered outer surface, and the central opening through the head plate has a matching tapered inner surface to be received thereon.

3. A method as claimed in claim 2 wherein a steel collar is fixed to one end of the sleeve whereby when the sleeve and head plate are located in position, the collar abuts against the underside of the head and the head plate in a position covering the joint between the tapered outer surface of the head and the matching tapered inner surface of the head plate.

4. A method as claimed in claim 3 wherein a cold terminal sleeve is fixed to the head plate and sealed around the projecting cold terminal of the heating element.

5. A method as claimed in claim 4 wherein step (h) includes machining off the steel sleeve to reduce the outside diameter of the nozzle.

6. A method as claimed in claim 2 wherein a filler duct is drilled in the body between the rear end and the spiral channel and the filler reservoir is located on the rear end over the filler duct, whereby when the copper is heated above its melting point in the vacuum furnace it runs down through the filler duct to fill the spiral channel around the heating element.

7. A method as claimed in claim 2 wherein the sealing of step (e) is carried out by lasar welding.

8. A method as claimed in claim 2 wherein the sealing of step (e) is carried out by brazing.

9. A method as claimed in claim 2 further comprising drilling bolt holes in the head plate to mount the nozzle in position in an injection molding system.

10. A method as claimed in claim 2 further comprising the steps of drilling a well in the outer surface of the body in communication with the spiral channel whereby when the copper is cast in during step (g) the well is filled with copper, and drilling a hole in the solidified copper to receive a thermocouple to measure the temperature adjacent the heating element.

11. A method as claimed in claim 2 wherein a central mouth is drilled in the forward end of the body to removably receive a steel insert having a predetermined configuration.

12. A method as claimed in claim 2 wherein a central mouth is drilled in the forward end of the body to removably receive a steel tip insert with a torpedo centrally mounted in a central bore in alignment with the central bore through the body, the tip insert having a nose portion which extends to engage the core of a mold during use to locate the forward end of the nozzle.

13. An integral injection molding heated nozzle comprising:

(a) an elongated steel body having a forward end and a rear end with a central bore extending therebetween, the body having a generally cylindrical outer surface with an enlarged head adjacent the rear end and a spiral channel extending therearound from adjacent the foward end to adjacent the rear end, the head having a tapered outer surface, (b) a steel head plate having a central opening therethrough with a tapered inner surface which matches the tapered outer surface of the head of the body, the head plate being seated on the head of the body with the tapered inner surface abutting on the tapered outer surface of the head to cover the portion of the spiral channel extending around the head, the head plate having a hole extending radially outward therethrough from the central opening and transverse bolt holes to mount the nozzle in position in an injection molding system, (c) a steel sleeve extending around the body from adjacent the forward end, the sleeve having a steel collar fixed to one end which abuts against the head, the sleeve having an inner diameter slightly larger than the outer diameter of the outer surface whereby the sleeve and collar cover the spiral channel between the head an the forward end of the body, and (d) an electrically insulated heating element wound in the spiral channel to extend from one end adjacent the forward end of the body to an opposite end having a cold terminal connected thereto extending out through the radially extending hole through the head plate, the heating element being vacuum cast in copper which completely fills the spiral channel and forms an integral bond between the heating element and the surrounding steel body and integrally bonds the sleeve to the outer surface of the body.

14. A nozzle as claimed in claim 13 wherein the pitch of the spiral channel varies along the length of the body according to a predetermined pattern to compensate for nonuniform heat loss from the nozzle.

* * * * *